(12) United States Patent
Golden et al.

(10) Patent No.: US 9,371,228 B2
(45) Date of Patent: Jun. 21, 2016

(54) INTEGRATED PROCESS FOR PRODUCTION OF OZONE AND OXYGEN

(71) Applicant: AIR PRODUCTS AND CHEMICALS, INC., Allentown, PA (US)

(72) Inventors: Timothy Christopher Golden, Nantes (FR); Vipul P. Dholakia, Macungie, PA (US); Sunita S. Sisodia, Harleysville, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 223 days.

(21) Appl. No.: 14/024,686

(22) Filed: Sep. 12, 2013

(65) Prior Publication Data

US 2015/0068365 A1    Mar. 12, 2015

(51) Int. Cl.
| | | |
|---|---|---|
| C01B 13/10 | (2006.01) | |
| C22B 1/02 | (2006.01) | |
| C01B 13/02 | (2006.01) | |

(52) U.S. Cl.
CPC ............. *C01B 13/10* (2013.01); *C01B 13/0203* (2013.01); *C22B 1/02* (2013.01); *C01B 13/0229* (2013.01)

(58) Field of Classification Search
None
See application file for complete search history.

(56) References Cited

U.S. PATENT DOCUMENTS

| | | |
|---|---|---|
| 3,856,671 A | 12/1974 | Lee et al. |
| 4,133,662 A | 1/1979 | Wagner |
| 6,044,978 A | 4/2000 | Newell et al. |
| 7,152,741 B2 | 12/2006 | Jara et al. |
| 7,789,332 B2 | 9/2010 | Heimala et al. |
| 2001/0025695 A1* | 10/2001 | Patt ............ B01J 31/182 162/72 |
| 2002/0088570 A1* | 7/2002 | Sundaram ......... D21C 9/153 162/65 |
| 2002/0148486 A1* | 10/2002 | Roche ............ B01J 19/002 134/19 |
| 2003/0049164 A1* | 3/2003 | Bon ............... A61L 2/183 422/28 |
| 2003/0150933 A1* | 8/2003 | Sands ............. A01G 7/06 239/172 |

FOREIGN PATENT DOCUMENTS

| | | |
|---|---|---|
| CN | 101314815 A | 12/2006 |
| EP | 0297090 A1 | 12/1988 |
| EP | 0550152 B1 | 7/1993 |
| EP | 1287834 A1 | 3/2003 |
| WO | 2012/100293 A1 | 8/2012 |

OTHER PUBLICATIONS

EP 0297090—English Translation from Espacenet.*
EP 0297090—English Abstract from EPO.*
T.J. Conocchioli et al., "The Formation of Iron(IV) in the Oxidation of Iron(II)," Journal of American Chemical Society, 87:4, Feb. 20, 1965, pp. 926-927.
C.A. Fleming, "Basic iron sulfate—a potential killer in the processing of refractory gold concentrates by pressure oxidation," Minerals & Metallurgical Processing; May 2010, 27, 2, p. 81.

* cited by examiner

*Primary Examiner* — Colin W Slifka
(74) *Attorney, Agent, or Firm* — Eric J. Schaal

(57) ABSTRACT

Embodiments of the present invention provide systems and methods for efficiently producing both a low-pressure ozone stream and high-pressure oxygen stream using a single air separation unit. The low-pressure ozone stream and high-pressure oxygen stream can be produced with significant energy savings and can be used in variety of applications, including the extraction of precious metals from ore with aqueous oxidation reactors and high-pressure oxidation reactors.

10 Claims, 2 Drawing Sheets

INTEGRATED PROCESS FOR PRODUCTION OF OZONE AND OXYGEN

BACKGROUND OF THE INVENTION

In some chemical and manufacturing plants, there is a simultaneous need for both oxygen and ozone for the designated equipment or processes. For example, the manufacture of precious metals, like gold, silver, or copper, often requires oxygen for production when using refractory ores. High pressure oxygen is used during the pressure oxidation process to oxidize sulfide minerals to more soluble forms of metal species that free the precious metal for downstream processing.

The application of high pressure oxygen for the production of precious metals is well known (See FLEMING, C. A., 2010, Basic iron sulfate—a potential killer in the processing of refractory gold concentrates by pressure oxidation. *Minerals & Metallurgical Processing* 27, 2, 81-880). The high pressure oxidation is used to extract precious metals from refractory ores.

In addition, in some cases it may be useful to employ ozone in this process to oxidize, precipitate, and recover base metals from the ore during the processing. For example, it has been traditionally shown that ozone is a very effective oxidizing agent to convert metal ions into less soluble forms which can be separated by precipitation. The utility of ozone to oxidize, for example, Fe(II) to Fe(III) has been shown in 1965 (Conocchioli et. al., *Journal of the American Chemical Society*, 1965, 87 (4) pp 926-927). U.S. Pat. No. 7,152,741 discloses the use of ozone for metals separation during flotation. U.S. Pat. No. 7,789,332 also discloses the use of ozone to facilitate oxidation, precipitation, and separation of desired metal species. PCT Application No. AU2012/000058 discloses use of ozone to facilitate separation of cobalt and manganese from the nickel containing ore.

Finally, nitrogen can be used as a gas to affect flotation separation of the ground minerals. For example, U.S. Pat. No. 6,044,978 discloses the utility of nitrogen as the gas employed in flotation processes.

Thus, in certain metals production processes the availability of oxygen, ozone and perhaps even nitrogen is desirable. However, the prior art is silent on the most efficient manner to produce oxygen, ozone, and nitrogen at a given chemical or manufacturing plant where all of these gases are desired.

Ozone ($O_3$) is a triatomic molecule consisting of three oxygen atoms that is most often produced from oxygen or air in an ozone generator, for example, that typically operates at low pressure (1-3 bara/100-300 kPa). Ozone is a strong oxidizing agent that finds applications in the disinfection of wastewater, removal of odor from drinking water, oxidation of metal species in aqueous solutions for selective precipitation of undesired metals, air purification, and also has beneficial use in the pulp and paper industry.

Generation of ozone is typically accomplished in an ozone generator in which an oxygen containing gas is passed through two electrodes separated by a dielectric and a discharge gap. When voltage is applied to the electrodes, electrons travel across the discharge gap. These electrons dissociate oxygen leading to the formation of ozone.

The feed to the ozone generator can be dry air, but the use of pure oxygen results in lower energy consumption and a higher ozone concentration exiting the generator. The ozone concentration of the ozone generator may reach 10 wt % (the remainder being oxygen) with oxygen as feed to the generator. Thus, in industrial applications it is typically preferred to feed the ozone generator with a feed stream high in oxygen content.

In many applications (e.g. waste water treatment), the ozone is sparged or bubbled into the waste water liquid stream. After the ozone has been decomposed through oxidation reactions, the gas exiting the liquid is relatively pure oxygen (90-98 wt %). The re-use of that oxygen increases the overall efficiency of the process.

A cryogenic or non-cryogenic oxygen generator may be used to supply the ozone generator with oxygen. Since the ozone generator only converts about 10% of the oxygen to ozone, to improve the overall efficiency of the process, the oxygen-rich waste stream after ozone utilization can be recycled back to the ozone generator to be reused. This recycling can reduce the size of the oxygen generator required for supply to the ozone generator. The recycling of waste oxygen to the ozone generator was disclosed in U.S. Pat. No. 3,856,671.

If high-pressure oxygen is required at the manufacturing plant (i.e., 5 to 40 bara/500 to 4,000 kPa) this is traditionally achieved by cryogenic distillation of high-pressure air. Alternatively, a non-cryogenic process can be employed (e.g., pressure swing adsorption or PSA) which produces oxygen at low pressure and that low-pressure oxygen must be then compressed to yield the high-pressure oxygen.

Therefore, in circumstances where there is both the need for high-pressure oxygen and low-pressure ozone, traditional methods would require two air separation units. Air separation units are expensive and costly to run and maintain. Thus, there is a need in the art for an improved equipment design and process that would require only one air separation device for the production of both low-pressure ozone and high-pressure oxygen.

SUMMARY OF THE INVENTION

Embodiments of the present invention satisfy the need in the art by providing apparatuses and processes for efficiently producing both a low-pressure ozone stream and high-pressure oxygen stream using a single air separation unit. There are several aspects of the apparatuses and processes, as outlined below.

Aspect 1. A process for producing oxygen and ozone, comprising:
  (a) compressing an air feed stream;
  (b) introducing the compressed air stream into an air separation unit to produce a purified oxygen stream;
  (c) introducing the purified oxygen stream into an ozone generator to produce a resultant stream comprising oxygen and ozone;
  (d) compressing the resultant stream;
  (e) introducing the compressed resultant stream into a first reactor;
  (f) performing an oxidation reaction in the first reactor to produce an oxygen-rich effluent stream;
  (g) compressing the oxygen-rich effluent stream from the first reactor;
  (h) introducing the compressed oxygen-rich stream into a second reactor; and
  (i) performing an oxidation reaction in the second reactor.

Aspect 2. The process of any of Aspects 1 and 3 through 13, wherein step (i) comprises performing an oxidation reaction comprising a combustion, roasting, high pressure oxidation or autoclaving reaction.

Aspect 3. The process of any of Aspects 1 and 2, and 4 through 13, wherein step (f) comprises oxidizing inorganic and/or organic materials.

Aspect 4. The process of any of Aspects 1 through 3, and 5 through 13, wherein step (f) comprises oxidizing inorganic and/or organic materials in an aqueous solution.

Aspect 5. The process of any of Aspects 1 through 4 and 6 through 13, wherein steps (a) through (i) are performed in the order presented in Aspect 1.

Aspect 6. The process of any of Aspects 1 through 5 and 7 through 13, further comprising:

(j) prior to performing step (g), pretreating the oxygen-rich effluent stream from the first reactor in an ozone destruct unit to decompose any unreacted ozone and produce an oxygen-rich stream.

Aspect 7. The process of any of Aspects 1 through 6 and 8 through 13, wherein step (j) comprises pretreating the oxygen-rich effluent stream from the first reactor in an ozone destruct unit to decompose any unreacted ozone and produce an oxygen-rich stream having an oxygen concentration that is greater than or equal to 90 wt %.

Aspect 8. The process of any of Aspects 1 through 7 and 9 through 13, wherein step (b) comprises introducing the compressed air feed stream into the air separation unit at a pressure greater than or equal to 2 bara (200 kPa) and less than or equal to 6 bara (600 kPa) to produce a purified oxygen stream.

Aspect 9. The process of any of Aspects 1 through 8 and 10 through 13, wherein the purified oxygen stream introduced into the ozone generator has an oxygen concentration that is greater than or equal to 95 vol %.

Aspect 10. The process of any of Aspects 1 through 9 and 11 through 13, wherein step (h) comprises introducing the compressed oxygen-rich stream into the second reactor at a pressure greater than or equal to 5 bara (500 kPa) and less than or equal to 40 bara (4,000 kPa).

Aspect 11. The process of any of Aspects 1 through 10 and 12 and 13, wherein step (b) comprises introducing the compressed air stream into a cryogenic air separation unit to produce a purified oxygen stream.

Aspect 12. The process of any of Aspects 1 through 11 and 13, wherein step (b) further comprises producing a nitrogen rich stream for use as a flotation or regeneration agent.

Aspect 13. The process of any of Aspects 1 through 12, wherein step (c) comprises introducing the purified oxygen stream into an ozone generator to produce a resultant stream comprising oxygen and ozone at a rate that is greater than or equal to 300 tons/day.

Aspect 14. An apparatus for producing oxygen and ozone, comprising:

a first compressor compressing an air feed stream;

an air separation unit fluidly connected to the first compressor, the air separation unit being operationally configured to produce a purified oxygen stream from the compressed air feed stream;

an ozone generator fluidly connected to the air separation unit, the ozone generator being operationally configured to produce a resultant stream comprising oxygen and ozone from the purified oxygen stream;

a first reactor fluidly connected to the ozone generator, the first reactor being operationally configured to oxidize inorganic and/or organic materials and produce an oxygen-rich stream;

a second compressor for compressing the oxygen-rich stream; and a second reactor fluidly connected to the second compressor, the second reactor being operationally configured to use the compressed resultant oxygen-rich stream to perform one or more of: combusting, roasting, autoclaving, and carrying out a high-pressure oxidation reaction.

Aspect 15. The apparatus of any of Aspects 14 and 16 through 18, further comprising an ozone destruct unit fluidly connected to the first reactor, the ozone destruct unit being operationally configured to decompose any unreacted ozone in the oxygen-rich stream prior to compressing the oxygen-rich stream in the second compressor.

Aspect 16. The apparatus of any of Aspects 14, 15, 17, and 18, wherein the first compressor is operationally configured to compress the air feed stream to a pressure greater than or equal to 2 bara (200 kPa) and less than or equal to 6 bara (600 kPa).

Aspect 17. The apparatus of any of Aspects 14 through 16 and 18, wherein the second compressor is operationally configured to compress the oxygen-rich stream to a pressure greater than or equal to 5 bara (500 kPa) and less than or equal to 40 bara (4,000 kPa).

Aspect 18. The apparatus of any of Aspects 14 through 17, wherein the air separation unit comprises a cryogenic air separation unit.

Aspect 19. A process for extracting metals from a refractory ore, the process comprising:

(a) introducing a first stream containing at least 1 wt % ozone into a first reactor;

(b) performing an oxidation reaction of metal ions in an aqueous solution in the first reactor at a first pressure to produce an oxygen-rich stream;

(c) introducing the oxygen-rich stream into a second reactor; and (d) performing an oxidation reaction on the refractory ore in the second reactor at a second pressure that is equal to or greater than the first pressure.

Aspect 20. The process of Aspect 19, further comprising reducing the amount of ozone in the oxygen-rich stream before introducing the oxygen-rich stream into the second reactor, wherein the oxidation reaction performed in the first reactor is performed at a temperature greater than or equal to 15 degrees Celsius and less than or equal to 60 degrees Celsius, wherein the oxidation reaction performed in the second reactor is performed at a temperature greater than or equal to 140 degrees Celsius and less than or equal to 350 degrees Celsius.

BRIEF DESCRIPTION OF THE DRAWINGS

The present invention will hereinafter be described in conjunction with the appended drawing figures wherein like numerals denote like elements.

DETAILED DESCRIPTION OF THE PREFERRED EMBODIMENT(S)

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

The term "conduit," as used in the specification and claims, refers to one or more structures through which fluids can be transported between two or more components of a system. For example, conduits can include pipes, ducts, and combinations thereof that transport liquids and/or gases at varying pressures throughout a production system.

The term "fluidly connected," as used in the specification and claims, refers to the nature of connectivity between two or more components that enables liquids and/or gases to be transported between the components in a controlled fashion. For example, an outlet of a compressor can be fluidly connected to an inlet of a reactor such that a gas stream can be transported to the reactor without leakage. Coupling two or more components such that they are fluidly connected with each other can involve any suitable method known in the art, such as with the use of flanged conduits, gaskets, and bolts.

The term "cryogenic," as used on the specification and claims, refers to a process that is carried out in a temperature less than or equal to −70 degrees C.

The term "air," as used on the specification and claims, refers to ambient air.

In the claims, letters may be used to identify claimed method steps (e.g. (a), (b), and (c)). These letters are used to aid in referring to the method steps and are not intended to indicate the order in which claimed steps are performed, unless and only to the extent that such order is specifically recited in the claims.

Figure 1:
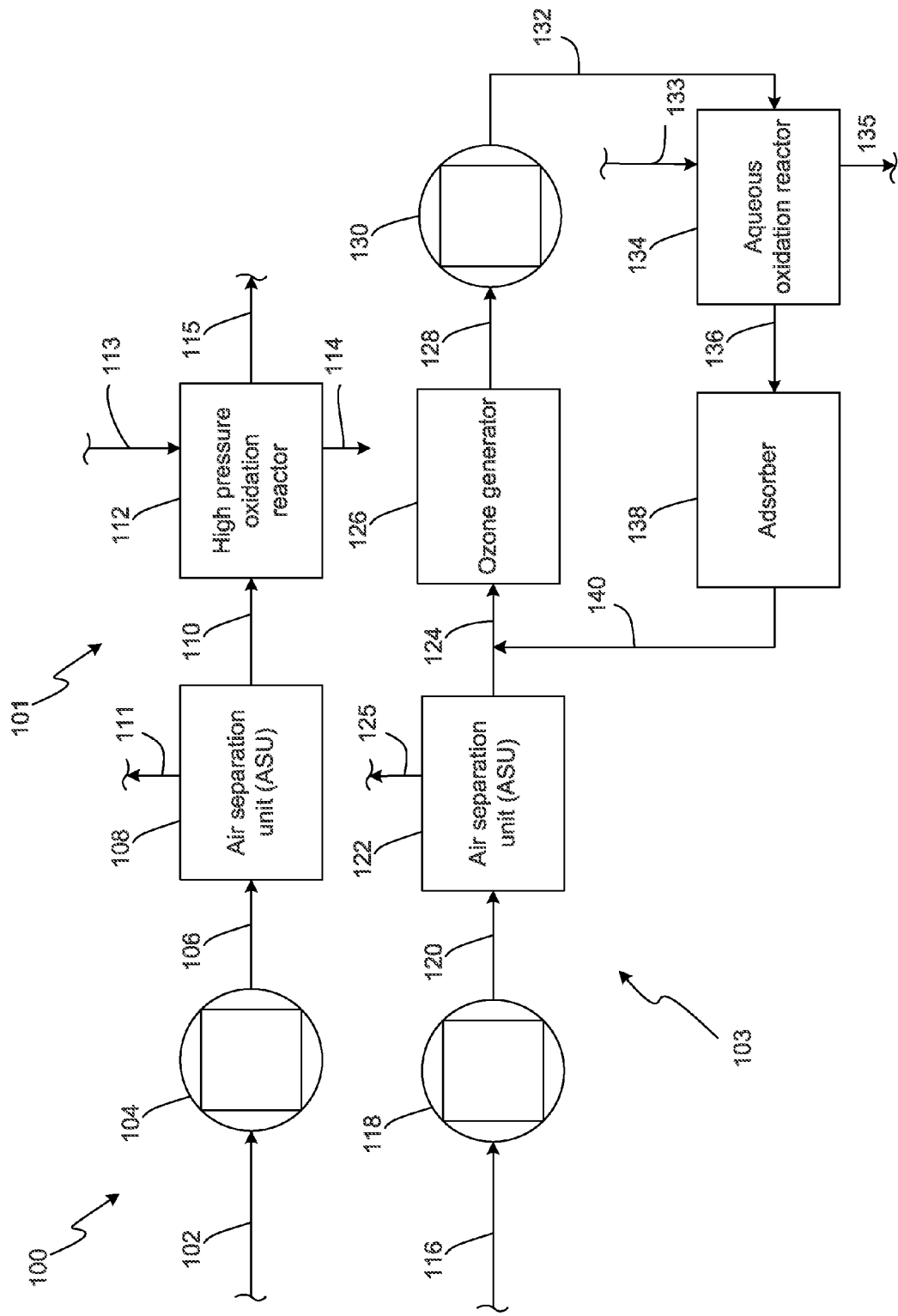
FIG. 1 is a block diagram of a prior art oxygen and ozone production system.
Figure 2:
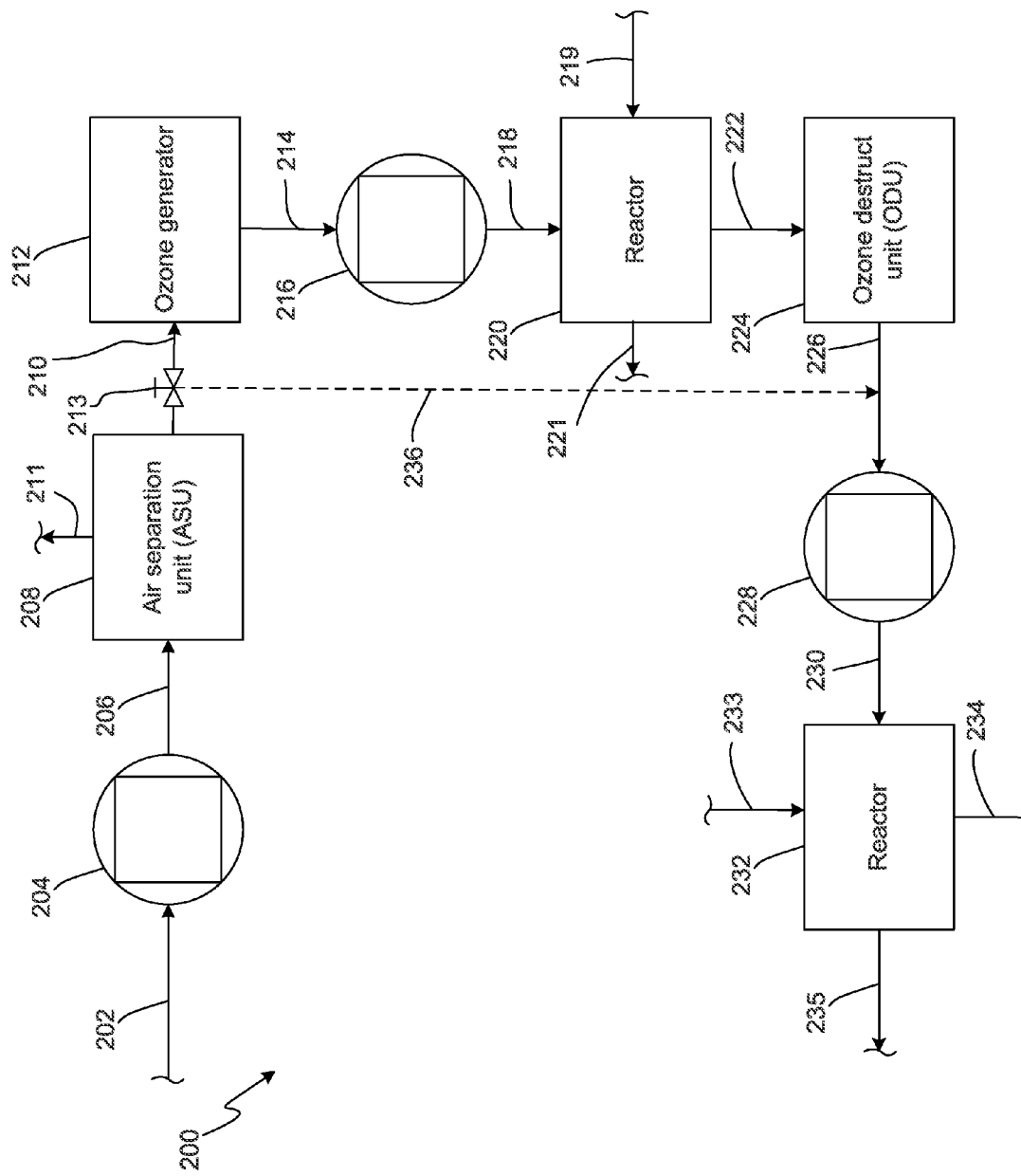
FIG. 2 is a block diagram of an oxygen and ozone production system in accordance with an exemplary embodiment of the present invention.

In FIGS. 1 and 2, conduits are depicted as lines with arrows connecting one or more other components of the systems. Each such conduit is fluidly connected to an outlet of a component (i.e., the component from which the line originates) and an inlet of another component (i.e., the component at which the arrow terminates), such that a gas and/or liquid can be carried therebetween.

FIG. 1 is a block diagram illustrating a prior art oxygen and ozone production system 100. The prior art oxygen and ozone production system 100 is representative of the current state of the art for simultaneous use of ozone and oxygen at a given commercial site. The prior art oxygen and ozone production system 100 includes a first subsystem 101 having a first air separation unit (ASU) 108 for producing oxygen for roasting or autoclaving purposes, as disclosed in U.S. Pat. No. 4,133,662, and a second subsystem 103 having an ASU 122 for producing oxygen to feed an ozone generator 126.

In the first subsystem, a first ambient air feed stream is carried by conduit 102 to a compressor 104 for compression to a high pressure (e.g., approximately 5 to 40 bara/500 to 4,000 kPa). The resultant compressed stream is carried via conduit 106 to the ASU 108 for cryogenic distillation. The ASU 108 produces a high pressure oxygen stream that is carried by conduit 110 to a high pressure oxidation reactor 112, and conduit 111 carries waste nitrogen from the ASU 108 for use in other applications and/or components of the ozone production system 100. The high pressure oxidation reactor 112 may be used to extract precious metals from refractory ores (e.g., breaking iron sulfide matrices in which gold is encapsulated in the ore), where conduit 113 feeds an ore slurry to the high pressure oxidation reactor 112 and conduit 114 carries the oxidized slurry product for collection and/or further processing (e.g., dissolving in cyanide). The Conduit 115 carries the flue gas effluent from the high pressure oxidation reactor 112 for venting to atmosphere and/or use in another application in the ozone production system 100.

A second air feed stream is carried by conduit 116 to a compressor 118 for compression to a lower pressure (e.g., 3 to 6 bara/300 to 600 kPa) than the first air feed stream is compressed in compressor 104. The resultant compressed stream is carried via conduit 120 to the second ASU 122 for cryogenic distillation. The second ASU 122 produces an oxygen stream that is carried by conduit 124 to an ozone generator 126. Conduit 125 carries waste nitrogen from the second ASU 122 for use in other applications and/or components of the ozone production system 100.

The ozone generator 126 produces a stream comprising ozone and oxygen, which is then carried by conduit 128 to compressor 130. The compressor 130 typically compresses the ozone and oxygen stream to within 1.5 to 40 bara (150 to 4,000 kPa). Conduit 132 carries the compressed ozone and oxygen stream for injection into an aqueous oxidation reactor 134. The aqueous oxidation reactor 134 may also be used for refractory ore processing, where conduit 133 feeds an ore slurry or pulp (e.g., pulverized ore in a slurry that has been concentrated via flotation to remove impurities) to the aqueous oxidation reactor 134 and conduit 135 carries the slurry product to the high pressure oxidation reactor 112 for further processing and extraction of precious metals. In addition to the product stream, the aqueous oxidation reactor 134 produces an oxygen waste stream. The prior art teaches a technique of recycling the waste oxygen stream from the aqueous oxidation reactor 134 to the front end of the ozone generator 126 (e.g., U.S. Pat. No. 3,856,671). In this way, the waste oxygen molecules are re-used as a feed stream to the ozone generator 126. The recycled feed stream to the ozone generator 126 must be dry and free of organic and other contaminants, however, and it is desired that any nitrogen present in the stream be reduced to below 5 vol % to reduce the amount of nitrogen oxides produced in the ozone generator 126. Thus, the waste oxygen stream is carried by conduit 136 to an adsorber 138, which pretreats the waste oxygen stream by removing water and other impurities. In addition, the pressure of the pretreated oxygen waste stream exiting the adsorber 138 typically must be reduced to 1.5 bara to 3 bara (150–300 kPa) prior to feeding the stream to the ozone generator 126. Conduit 140 then carries the pretreated oxygen waste stream for recycling back to conduit 124 to feed the ozone generator 126.

FIG. 2 is a block diagram of an oxygen and ozone production system 200 in accordance with an exemplary embodiment of the present invention. For example, the oxygen and ozone production system 200 can be used for simultaneous ozone and oxygen production for base and precious metal production. An air feed stream is carried by conduit 202 to a compressor 204 for compression to a relatively low pressure (e.g., approximately 2 to 6 bara/200 to 600 kPa) relative to the pressure produced in the later compressor 228. The resultant compressed stream is carried via conduit 206 to an ASU 208 for cryogenic distillation to produce oxygen and nitrogen streams. The oxygen stream, which has a purity of approximately 95 vol % or higher, is carried by conduit 210 to an ozone generator 212. The nitrogen stream is carried by conduit 211 for use in other applications and/or components of the system, such as, for example, use as a regeneration agent for regenerating pre-treatment beds of the ASU 208 and/or the ozone destruct unit (ODU) 224, use as a flotation agent in flotation separation of ground ore minerals, and/or use as an additive gas to stabilize plasma in the ozone generator 212.

The ozone generator 212 converts the oxygen stream into a mixed stream of ozone and oxygen comprising approximately 10 wt % ozone. A plurality of ozone generators (not shown) could be used if the desired ozone delivery rate exceeding the capacity of a single ozone generator is desired. The ozone generator 212 may produce up to or greater than 15 wt % ozone or as little as 1 wt % ozone depending on the amount of energy utilized. In a typical base and precious metals production facility, the ozone generator 212 may produce ozone gas in the mixed stream at a rate of 1 to 60 tons of ozone per day. The ASU 208 may produce oxygen at a rate of 300 to 3,000 tons/day. Accordingly, this exemplary embodiment is capable of a production of 300-4,000 tons of gas per day at the resultant streams of both the ozone generator 212 and ASU 208.

Conduit 214 carries the mixed stream to an optional compressor 216. Typically, a higher pressure ozone stream is required (e.g., 1.5 to 40 bara/150 to 4,000 kPa), and the optional compressor 216 is used to increase the pressure of the mixed stream exiting the ozone generator 212. In other embodiments, the optional compressor 216 can be omitted from the system.

Conduit 218 carries the mixed stream from the optional compressor 216 to a reactor 220. In this exemplary embodiment, the mixed stream is used to oxidize inorganic and/or organic materials fed to the reactor 220 via conduit 219. For example, the reactor 220 can be implemented with an aqueous oxidation reactor, as previously discussed, and the mixed stream can be used to sparge an aqueous ore slurry fed via conduit 219 in order to enhance desired oxidation reactions. The oxidized aqueous ore slurry product can then be carried by conduit 221 for further processing, including high pressure oxidation in the reactor 232 and/or one or more intermediate processes (not shown). By control of temperature and pH of the reactor 220 and aqueous ore slurry, selective precipitation of desired base metals (e.g., Fe, Mn, Co, Cu, Ni, Zn, etc.) can be accomplished for further upgrading. Preferably, the oxidation reactions are performed in the reactor 220 at a temperature that is greater than or equal to 15 degrees Celsius and less than or equal to 60 degrees Celsius.

The reactor 220 produces a waste oxygen-rich gas stream that is carried by conduit 222 to an ozone destruct unit (ODU) 224. Unlike the prior art ozone production system 100, the pressure of the waste oxygen-rich gas stream that exits the reactor 220 does not need to be reduced, as the stream is not being recycled back to the ozone generator 212. Instead, the ODU 224 is first used to decompose unreacted ozone and pretreat the waste oxygen-rich gas stream, if necessary. The ODU 224 may be, for example, a fixed bed adsorber to remove impurities. Preferably, the ODU 224 decomposes unreacted ozone and produces an oxygen-rich stream having an oxygen concentration that is greater than or equal to 90 wt %. The resultant stream is then carried by conduit 226 to a compressor 228.

The compressor 228 produces a high-pressure oxygen stream (e.g., 5 to 40 bara/500 to 4,000 kPa) relative to the pressure produced in compressor 204. Because the pressure of the waste oxygen-rich gas stream need not be reduced prior to being fed to the ODU 224, the energy required to compress the waste oxygen-rich gas stream in the compressor 228 is reduced; such energy savings are further increased where the reactor 220 is operated at higher pressures (e.g., a high-pressure aqueous oxidation reactor). The resultant high-pressure oxygen stream is then carried by conduit 230 to the reactor 232, where the high-pressure oxygen stream is used for combustion, roasting, autoclaving, and/or high pressure oxidation reactions. For example, the reactor 232 may be a pressure oxidation reactor that receives oxidized aqueous ore slurry product from the reactor 220 via conduit 233 and further oxidizes the ore slurry, as previously discussed, producing a product carried by conduit 234 for collection and/or further processing to recover precious metals. The reactor 232 can be operated, for example, in accordance with the pressure oxidation technique taught by U.S. Pat. No. 4,552,589 to Mason et al., which is hereby incorporated by reference in its entirety. In other embodiments, the product from the reactor 232 can instead be carried via conduit 234 and fed to the reactor 220 via conduit 219 for further reaction (i.e., the product stream can flow counter-currently to the mixed stream and oxygen streams discussed above).

Preferably, the oxidation reactions are performed in the reactor 232 at a temperature that is greater than or equal to 140 degrees Celsius and less than or equal to 350 degrees Celsius. More preferably, the oxidation reactions are performed in the reactor 232 at a temperature that is greater than or equal to 170 degrees Celsius and less than or equal to 210 degrees Celsius. Conduit 235 carries the effluent from the reactor 232 for venting to atmosphere and/or use in another application in the system.

The oxygen and ozone production system 200 also includes a valve 213 and a bypass conduit 236 that couples conduit 210 to conduit 226 and can be used to bypass the ozone generator 212. For example, if base metal production is not desired, there is no need for ozone injection into the reactor 220. In that case, the ozone generator 212 may be bypassed by diverting part or all of the oxygen stream via bypass conduit 236, where it can be combined with oxygen flowing from the ODU 224 and can be carried by conduit 226 to the compressor 228. Similarly, all or part of the oxygen stream may be diverted via bypass conduit 236 where the reactor 232 requires a greater quantity of high-pressure oxygen. In this way, there is no need to discontinue operation of the ASU 208 if the ozone demand of the reactor 220 changes, as the oxygen and ozone production system 200 provides flexibility in the amount of ozone being fed to the reactor 220 and the amount of oxygen being fed to the reactor 232.

Accordingly, the oxygen and ozone production system 200 has distinct advantages over the prior art oxygen and ozone production system 100. One key aspect is that the oxygen and ozone production system 200 requires only one ASU and still provides greater flexibility to meet varying ozone and oxygen demands of the reactors 220 and 232, whereas the prior art oxygen and ozone production system 100 requires two ASUs. Further, the prior art oxygen and ozone production system 100 recycles oxygen to the ozone generator 126 via conduit 140, but only a small fraction of the oxygen is converted to ozone, and the oxygen feed gas purity requirements of the ozone generator 126 typically require the recycled oxygen stream to first be dried and treated with the adsorber 138 to remove impurities (e.g., nitrogen, hydrocarbons and other organic compounds, corrosive inorganic compounds, etc.), which adds cost and complexity to the process. On the other hand, recycling the waste oxygen from the ozone generator 212 for high pressure oxidation, roasting, or an autoclaving process (or any combustion process) does not require a high purity oxygen stream, which obviates the need for such extensive drying and pretreating of the oxygen stream and decreases the cost of operation.

EXAMPLE

The following is an example showing the amount of power required to compress product gases for an aqueous oxidation reactor and a high pressure oxidation reactor using a prior art oxygen and ozone production system as compared to an oxygen and ozone production system according to an embodiment of the invention. Specifically, the example and data provided herein are based on computer simulations of the prior art oxygen and ozone production system 100 of FIG. 1 and the oxygen and ozone production system 200 of FIG. 2, where the reactor 220 is an aqueous oxidation reactor and the reactor 232 is a high-pressure oxidation reactor. Certain simulation parameters and simulated data have been excluded from the following discussion for clarity. Accordingly, the example and data provided in Table 1 are illustrative and not necessarily representative of complete systems and actual data that might exist when implementing embodiments of the invention.

TABLE 1

| System | Power to Compress air for ASU(s) (kW) | Power to Compress Ozone/ Oxygen gas for Aqueous Oxidation Reactor (kW) | Power to Compress Oxygen-rich gas for High-Pressure Oxidation Reactor (kW) | Total Compression Power (kW) |
|---|---|---|---|---|
| Oxygen and ozone production system 100 (prior art) | 6875 | 1060 | N/A | 7935 |
| Oxygen and ozone production system 200 | 5545 | 1167 | 363 | 7075 |

In the example, the oxygen and ozone production system 100 and the oxygen and ozone production system 200 were each simulated to produce 400 tons/day of 99.5 wt % purity oxygen for a high pressure oxidation reactor and 40 tons/day of ozone for an aqueous oxidation reactor, where the ozone generators (i.e., ozone generators 126 and 212) yielded streams of 10 wt % ozone and 9.1 wt % ozone, respectively, at a 2 bara (200 kPa). In the prior art oxygen and ozone production system 100, two compressors 104 and 118 required a combined 6,875 kW to compress air and feed the two ASUs 108 and 122. The product from the ozone generator 126 was compressed the compressor 130 (i.e., a three-stage compressor), which required 1,060 kW to compress the product from 2 bara (200 kPa) to 20 bara (2,000 kPa) to feed the aqueous oxidation reactor 134. The 400 tons/day of oxygen needed for the high pressure oxidation reactor 112 was produced by the ASU 108 at a pressure of 40 bara (4,000 kPa).

In the oxygen and ozone production system 200, all oxygen required for all of the reactions is produced in a single ASU 208. The compressor 204 required 5,545 kW to compress air and feed the ASU 208. The product from the ozone generator 212 was compressed with the compressor 216 (i.e., a three-stage compressor), which required 1,167 kW to compress the product from 2 bara (200 kPa) to 20 bara (2,000 kPa) to feed the reactor 220. The waste oxygen-rich gas stream from the reactor 220 (i.e., via conduit 222), which introduced a 2 bara (200 kPa) pressure drop, was then compressed in the compressor 228 (i.e., a single stage compressor). The compressor 228 required 363 kW to compress the waste oxygen-rich gas stream from 18 bara (1,800 kPa) to 40 bara (4,000 kPa) to feed the reactor 232. For simplicity, in this example, it was assumed that all ozone was consumed in the reactor 220 and that the oxygen in the mixed stream fed to the reactor 220 via conduit 218 was recovered as the waste oxygen-rich gas stream. In actual operation, it would be expected that a portion of ozone is not consumed in the reactor 220, but would be converted to oxygen in the ODU 224.

As shown in Table 1, the total power consumption for the compressors of the prior art oxygen and ozone production system 100 was 7,935 kW, while the total power consumption for the compressors of the oxygen and ozone production system 200 was only 7,075 kW. Accordingly, the oxygen and ozone production system 200 required approximately 11% less power than the prior art oxygen and ozone production system 100 to produce the same volumes of oxygen and ozone.

While the principles of the invention have been described above in connection with preferred embodiments, it is to be clearly understood that this description is made only by way of example and not as a limitation of the scope of the invention.

The invention claimed is:

1. A process for producing oxygen and ozone, comprising:
   (a) compressing an air feed stream;
   (b) introducing the compressed air stream into an air separation unit to produce a purified oxygen stream;
   (c) introducing the purified oxygen stream into an ozone generator to produce a resultant stream comprising oxygen and ozone;
   (d) compressing the resultant stream;
   (e) introducing the compressed resultant stream into a first reactor;
   (f) performing an oxidation reaction of inorganic materials in an aqueous solution in the first reactor to produce an oxygen-rich effluent stream;
   (g) compressing the oxygen-rich effluent stream from the first reactor;
   (h) introducing the compressed oxygen-rich stream into a second reactor; and
   (i) performing an oxidation reaction of inorganic materials in a non-aqueous solution in the second reactor, wherein the oxidation reaction in the second reactor is performed at a temperature that is greater than or equal to 140 degrees Celsius and less than or equal to 350 degrees Celsius.

2. The process of claim 1, wherein step (i) comprises performing an oxidation reaction comprising a combustion, roasting, high pressure oxidation or autoclaving reaction.

3. The process of claim 1, further comprising:
   (j) prior to performing step (g), pretreating the oxygen-rich effluent stream from the first reactor in an ozone destruct unit to decompose any unreacted ozone and produce an oxygen-rich stream.

4. The process of claim 3, wherein step (j) comprises pretreating the oxygen-rich effluent stream from the first reactor in an ozone destruct unit to decompose any unreacted ozone and produce an oxygen-rich stream having an oxygen concentration that is greater than or equal to 90 wt %.

5. The process of claim 1, wherein step (b) comprises introducing the compressed air feed stream into the air separation unit at a pressure greater than or equal to 2 bara (200 kPa) and less than or equal to 6 bara (600 kPa) to produce a purified oxygen stream.

6. The process of claim 1, wherein the purified oxygen stream introduced into the ozone generator has an oxygen concentration that is greater than or equal to 95 vol %.

7. The process of claim 1, wherein step (h) comprises introducing the compressed oxygen-rich stream into the second reactor at a pressure greater than or equal to 5 bara (500 kPa) and less than or equal to 40 bara (4,000 kPa).

8. The process of claim 1, wherein step (b) comprises introducing the compressed air stream into a cryogenic air separation unit to produce a purified oxygen stream.

9. The process of claim 1, wherein step (b) further comprises producing a nitrogen rich stream for use as a flotation or regeneration agent.

10. The process of claim 1, wherein step (c) comprises introducing the purified oxygen stream into an ozone generator to produce a resultant stream comprising oxygen and ozone at a rate that is greater than or equal to 300 tons/day.

* * * * *